United States Patent
Chinnathambi Kailasam et al.

(10) Patent No.: US 12,259,956 B2
(45) Date of Patent: Mar. 25, 2025

(54) USER EQUIPMENT AUTO-UNLOCK OPTIMIZATION

(71) Applicant: Apple Inc., Cupertino, CA (US)

(72) Inventors: Naresh Kumar Chinnathambi Kailasam, Freemont, CA (US); Vasilios E. Anton, San Francisco, CA (US); Christian Seifert, Bornheim (DE); Ramanujam Jagannath, Cupertino, CA (US); Shannon Shih, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 17/445,621

(22) Filed: Aug. 23, 2021

(65) Prior Publication Data

US 2023/0057201 A1 Feb. 23, 2023

(51) Int. Cl.
| G06F 21/00 | (2013.01) |
| G06F 21/32 | (2013.01) |
| G06F 21/35 | (2013.01) |
| G06F 21/40 | (2013.01) |

(52) U.S. Cl.
CPC .............. G06F 21/32 (2013.01); G06F 21/35 (2013.01); G06F 21/40 (2013.01)

(58) Field of Classification Search
CPC .......... G06F 21/32; G06F 21/35; G06F 21/40; H04W 12/33
See application file for complete search history.

(56) References Cited

U.S. PATENT DOCUMENTS

| 2019/0370449 A1* | 12/2019 | Van Os ................ G06F 21/32 |
| 2020/0285726 A1* | 9/2020 | Kalous ............... G07C 9/00182 |
| 2021/0126940 A1* | 4/2021 | O'Hara ................ H04L 63/126 |
| 2021/0304537 A1* | 9/2021 | Reed ..................... G06F 18/22 |
| 2022/0075577 A1* | 3/2022 | Uchino .................. G06V 40/70 |
| 2022/0075862 A1* | 3/2022 | Torre ................... G06V 40/172 |

FOREIGN PATENT DOCUMENTS

| CN | 104899498 | * | 6/2015 | .............. G06F 21/32 |
| CN | 107622232 | * | 9/2017 | .............. G06F 21/36 |
| CN | 113807172 | * | 8/2021 | .............. G06F 21/32 |
| EP | 3454240 B1 | * | 8/2018 | .............. G06F 21/32 |

* cited by examiner

*Primary Examiner* — Joseph P Hirl
*Assistant Examiner* — Chi D Nguy
(74) *Attorney, Agent, or Firm* — Fay Kaplun & Marcin, LLP

(57) ABSTRACT

A user equipment (UE) is configured to perform a prewarming process, wherein the prewarming process includes concurrently performing a face detection process and an unlock process independent of face detection, determine whether a face detection operation indicates the presence of a face within a field of view of a camera of the UE and disable prewarming for a predetermined time period when the face detection operation is not satisfied.

20 Claims, 5 Drawing Sheets

USER EQUIPMENT AUTO-UNLOCK OPTIMIZATION

BACKGROUND

There have been various improvements for accessing devices without user input. For example, face detection is a feature that allows a user to unlock a user equipment (UE) (e.g., a mobile device) using their face. Upon detection of the user's face, the UE will unlock without any further input from the user. Another example of accessing a device without user input is using a user's trusted device (e.g., a wearable device) to unlock a target device (e.g., a computing device).

SUMMARY

Some exemplary embodiments are related to a processor of a user equipment (UE) configured to perform operations. The operations include performing a prewarming process, wherein the prewarming process includes concurrently performing a face detection process and an unlock process independent of face detection, determining whether a face detection operation indicates the presence of a face within a field of view of a camera of the UE and disabling prewarming for a predetermined time period when the face detection operation is not satisfied.

Other exemplary embodiments are related to a user equipment (UE) having a transceiver configured to communicate with a wearable device and a processor communicatively coupled to the transceiver and configured to perform operations. The operations include performing a prewarming process, wherein the prewarming process includes concurrently performing a face detection process and an unlock process independent of face detection, determining whether a face detection operation indicates the presence of a face within a field of view of a camera of the UE and disabling prewarming for a predetermined time period when the face detection operation is not satisfied.

Still further exemplary embodiments are related to a processor of a user equipment (UE) configured to perform operations. The operations include storing first locations corresponding to successful attempts to unlock the UE using a prewarming process, wherein the prewarming process includes simultaneously detecting a face of a user and performing a ranging process with a wearable device, storing second locations corresponding to unsuccessful attempts to unlock the UE using the prewarming process and determining whether to perform the prewarming process based on a current location of the UE and the first and second stored locations.

DETAILED DESCRIPTION

Figure 1:
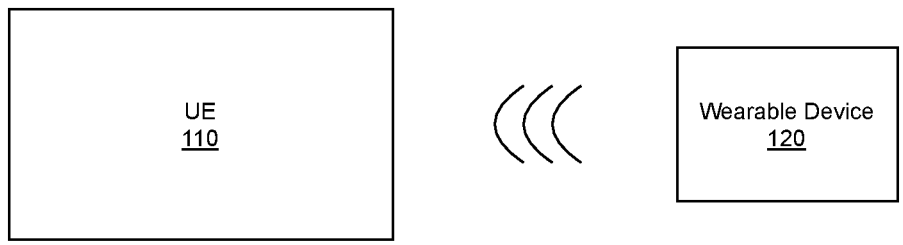
FIG. 1 shows an exemplary arrangement of a user equipment (UE) and a wearable device according to various exemplary embodiments.

The exemplary embodiments may be further understood with reference to the following description and the related appended drawings, wherein like elements are provided with the same reference numerals. The exemplary embodiments relate to auto-unlocking of a user equipment (UE) using a wearable device.

When a UE (e.g., a mobile device) performs face detection, further user input (e.g., a passcode) may not be required to unlock the UE. As such, a streamlined and expeditious manner of unlocking the UE is achieved. However, in some cases, such as, for example, during the COVID-19 pandemic, the user may be wearing some type of partial face covering (e.g., a mask) that obscures at least a portion of the user's face. As a result, face detection cannot be successfully performed by the UE, thus requiring some user input (e.g., entering a passcode) to unlock the UE.

To address this issue, a user's wearable device has been used to unlock the UE when face detection fails on the UE. This unlocking procedure uses a ranging process such as, for example, the ranging process described in U.S. Patent Application Publication 20190318074, which may be initiated once the UE determines that the user is wearing a face covering. However, performing the face detection process and then the ranging process afterwards if the face detection fails increases the latency of the unlocking process.

To decrease the latency of the unlocking process, a prewarming process can be implemented, by which the face detection and the ranging are performed in parallel when the UE determines that the user is wearing a face covering during a previous unlock attempt. If the ranging process is completed before completion of the face detection process, the UE will wait for the completion of the face detection process before unlocking. However, one major drawback of such an unlocking procedure is silent cancels where the user interacts with (e.g., picks up) the UE without intending to unlock the UE. In such a scenario, the ranging process is initiated even though the user is not attempting to unlock the UE. Because the ranging process will be completed with no face detection, the UE will not unlock. Multiple silent cancels may result because of this drawback, thus adversely affecting the power consumption of the wearable device, which in turn impacts battery life.

According to some exemplary embodiments, the UE is configured to perform a prewarming backoff for a predetermined duration of time after a silent cancel. As a result, the number of consecutive silent cancels is significantly reduced, thus improving the battery life of the wearable device.

According to further exemplary embodiments, the UE may be configured to utilize machine learning to improve location-based prewarming, such that prewarming is performed at locations where it is most likely that the user is wearing a face covering.

Although the following description focuses on prewarming the ranging process until the UE detects a face covering, it should be noted that the embodiments described herein may be equally applicable to any situation in which a resource-intensive action (similar to the ranging process) is prewarmed until a triggering event occurs (similar to the detection of a face covering). The resource-intensive action may be any action performed by the UE to prepare the UE to be unlocked in the alternative to face detection. Alternatively, the resource-intensive action may be calling up an energy intensive radio data interface (e.g., WiFi, Bluetooth, near field communications (NFC), ultra-wideband (UWB) communications, etc.) in anticipation of some user interaction, which would serve as the triggering event. In another example, the resource-intensive action may be the processing of a large quantity of data from a sensor in anticipation of the user trying to access that data, which would serve as the actual triggering event. Other examples of a triggering event may be the user entering or leaving a geofence. Another example of a resource intensive action is background downloading of emails in anticipation of the user accessing the emails, which would serve as the triggering event.

FIG. 1 shows an exemplary arrangement 100 of a user equipment (UE) and a wearable device according to various exemplary embodiments. The exemplary arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc.

The UE 110 may be configured to communicate with one or more wearable devices via a short-range wireless communication protocol such as, for example, Bluetooth. In the example of the arrangement 100, the wearable device 120 with which the UE 110 may wirelessly communicate may be a smartwatch. Thus, if the UE 110 and the wearable device 120 are within a proximity of one another (e.g., within a distance in which Bluetooth communications may be performed), the UE 110 and the wearable device 120 may exchange data. In one exemplary scenario, if the short-range communication protocol is being used, the UE 110 and the wearable device 120 may have a companion relationship where the UE 110 is a companion device (e.g., mobile phones, tablet computers, smartphones, phablets) and the wearable device 120 is an accessory device (e.g., a smartwatch). However, it should be understood that the UE 110 may also communicate with other types of wearable devices.

Figure 2:
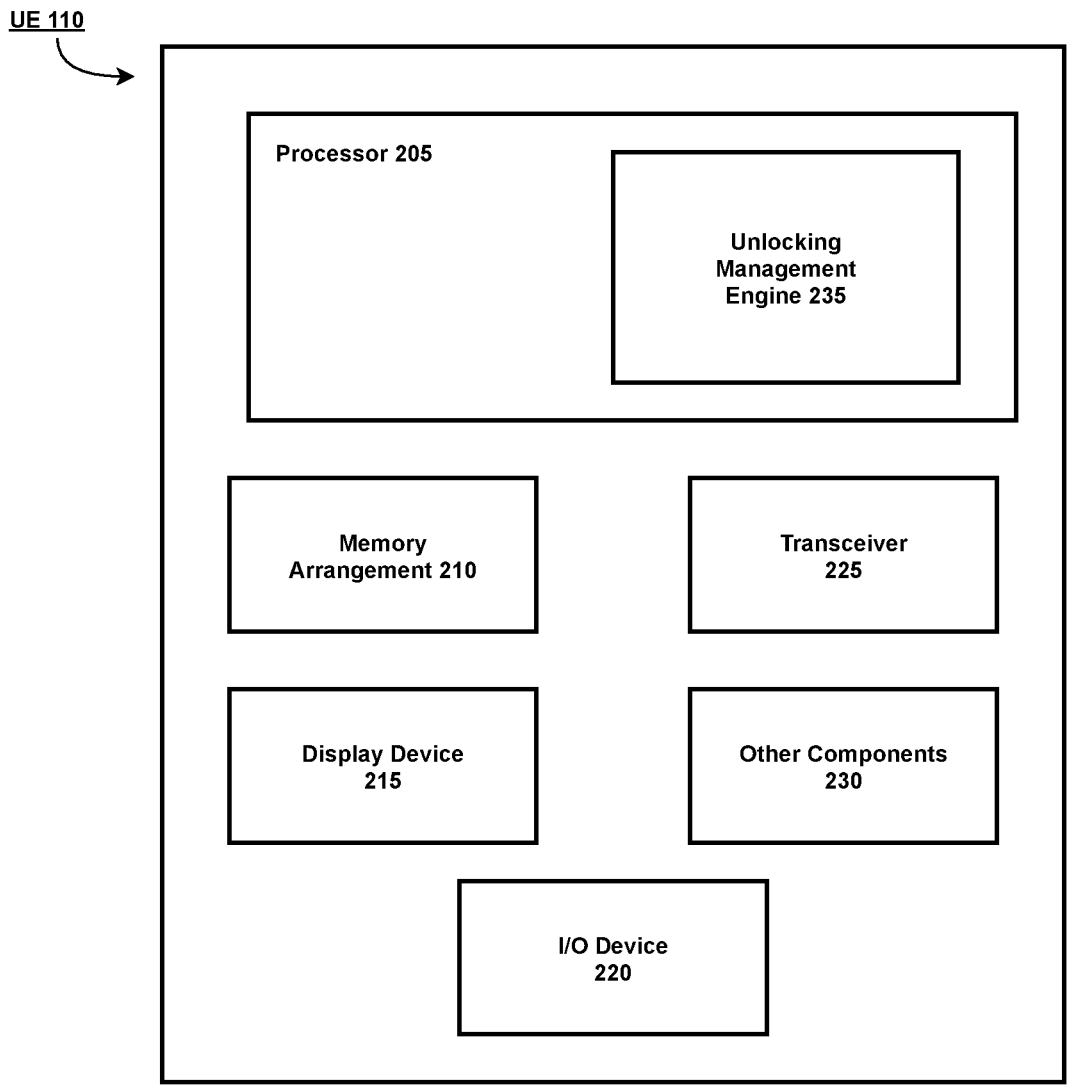
FIG. 2 shows an exemplary UE according to various exemplary embodiments.

FIG. 2 shows an exemplary UE 110 according to various exemplary embodiments. The UE 110 will be described with regard to the arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, a camera, an audio input device, an audio output device, a battery that provides a limited power supply, a data acquisition device, ports to electrically connect the UE 110 to other electronic devices, one or more antenna panels, etc.

The processor 205 may be configured to execute a plurality of engines of the UE 110. For example, the engines may include an unlocking management engine 235. The unlocking management engine 235 may perform various operations related to unlocking the UE 110 using face recognition and performing a ranging operation with the wearable device 120, as will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with a wireless network (e.g., a 5G new radio (NR)-radio access network (RAN), a long term evolution (LTE)-RAN, a wireless local area network (WLAN), etc.). Accordingly, the transceiver 225 may operate on a variety of different frequencies or channels (e.g., set of consecutive frequencies).

Figure 3:
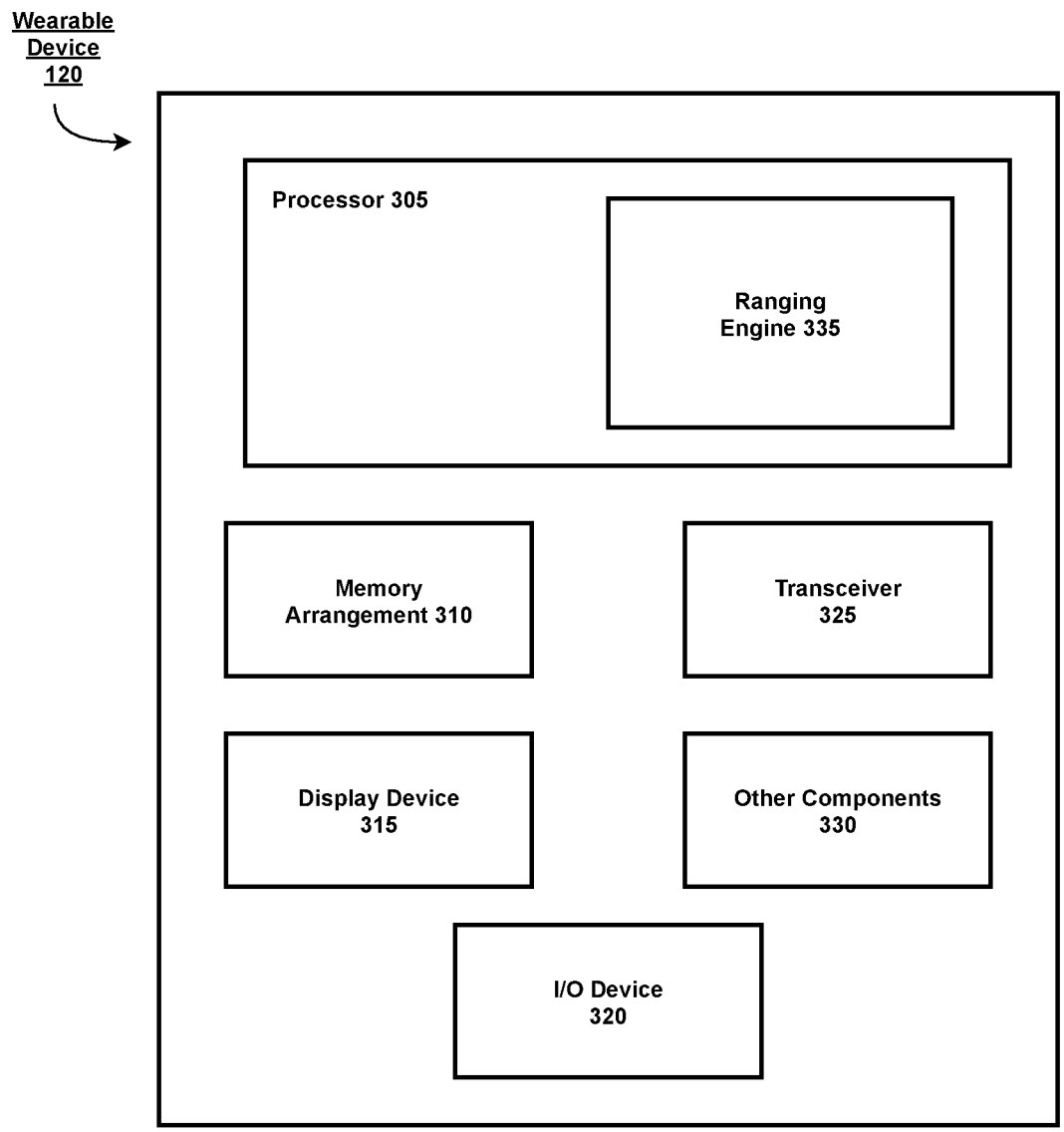
FIG. 3 shows an exemplary wearable device according to various exemplary embodiments.

FIG. 3 shows an exemplary wearable device 120 according to various exemplary embodiments. The wearable device 120 will be described with regard to the arrangement 100 of FIG. 1. The wearable device 120 may include a processor 305, a memory arrangement 310, a display device 315, an input/output (I/O) device 320, a transceiver 325 and other components 330. The other components 330 may include, for example, an audio input device, an audio output device, a battery that provides a limited power supply, a data acquisition device, one or more antenna panels, etc.

The processor 305 may be configured to execute a plurality of engines of the wearable device 120. For example, the engines may include a ranging engine 335. The ranging engine 335 may perform various operations related to performing a ranging operation with the UE 110, as will be described in greater detail below.

The above referenced engine being an application (e.g., a program) executed by the processor 305 is only exemplary. The functionality associated with the engine may also be represented as a separate incorporated component of the wearable device 120 or may be a modular component coupled to the wearable device 120, e.g., an integrated circuit with or without firmware. For example, the integrated circuit may include input circuitry to receive signals and processing circuitry to process the signals and other information. The engines may also be embodied as one application or separate applications. In addition, in some wearable devices, the functionality described for the processor 305 is split among two or more processors such as a baseband processor and an applications processor. The exemplary embodiments may be implemented in any of these or other configurations of a wearable device.

The memory arrangement 310 may be a hardware component configured to store data related to operations performed by the wearable device 120. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with a wireless network (e.g., a 5G NR-RAN, an LTE-RAN, a WLAN, etc.). Accordingly, the transceiver 325 may operate on a variety of different frequencies or channels (e.g., set of consecutive frequencies).

Figure 4:
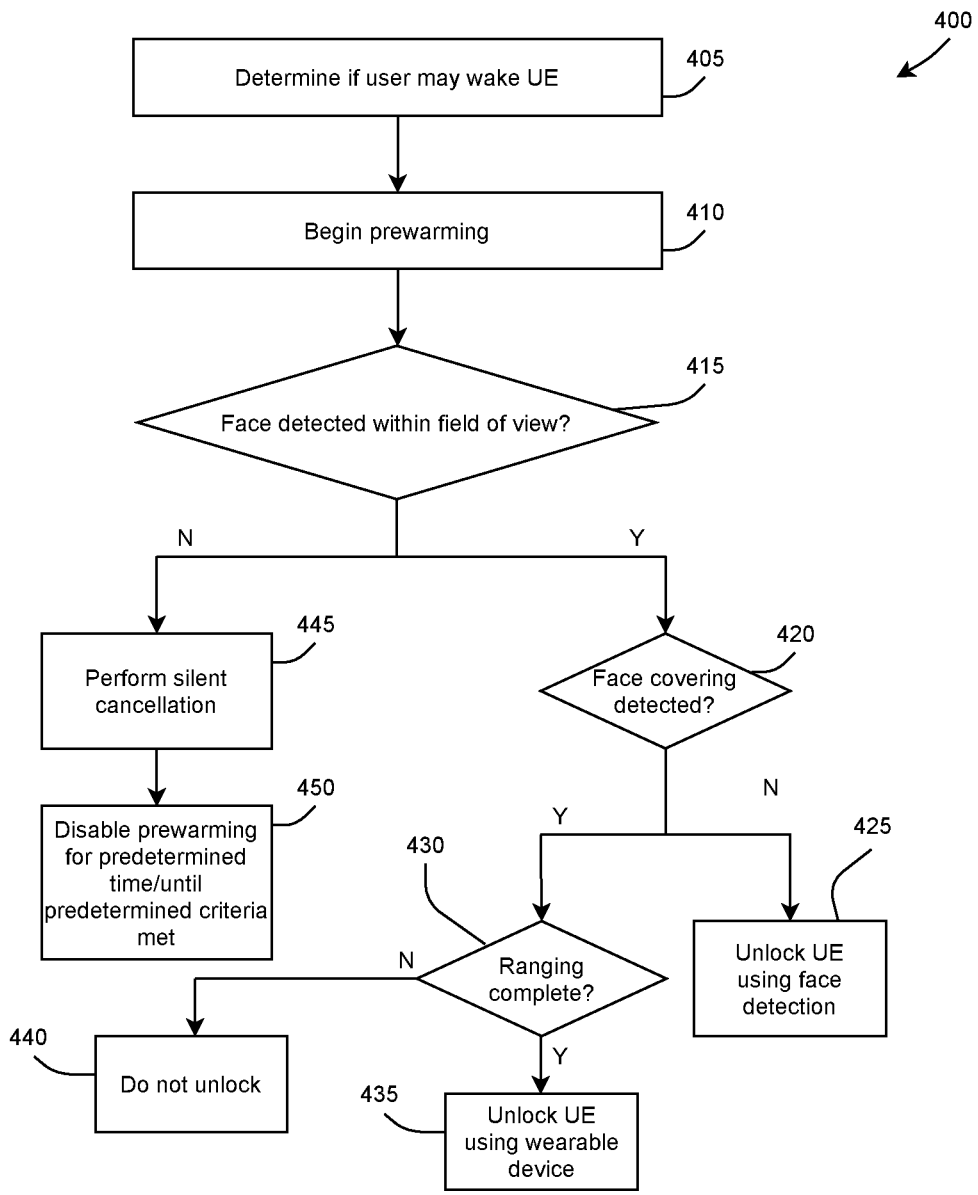
FIG. 4 shows an exemplary method of auto-unlocking a UE according to various exemplary embodiments.

FIG. 4 shows an exemplary method 400 of auto-unlocking a UE 110 according to various exemplary embodiments. The exemplary embodiment of FIG. 4 is described with reference to the prewarming process including a ranging operation and the triggering event being the detection of a face covering. However, it should be understood that these are only examples and the prewarming process may include any resource-intensive action performed by the UE to prepare the UE to be unlocked in the alternative to face detection. Similarly, the triggering event may be any event that indicates to the UE that the face detection process failed but the user still intends to unlock the UE.

At 405, the UE 110 determines whether the user may possibly wake the UE 110. This determination may be based on, for example, a detection of movement of the UE 110, indicating that it is possible that the user will be interacting with the UE 110 to wake the UE. In such an embodiment, the UE 110 may include an accelerometer or gyroscope that detects such movements.

Alternatively, the determination at 405 may be an actual wake. This wake may be due to an intentional action by the user such as, for example, the user interacting with the UE 110 to unlock and access the UE 110. Alternatively, the intentional action by the user may be some short interaction with the UE 110 (e.g., checking the time or date) without intending to unlock the UE 110 (e.g., a screen tap or a button push without moving the UE 110). In some embodiments, the wake may be due to an unintentional interaction with the UE 110 that would cause the UE 110 to misinterpret the interaction as an intent to wake (e.g., a bump or other sudden motion of the UE 110).

At 410, the UE 110 begins the prewarming process (face detection operation using a camera of the UE 110 and an unlock process independent of the face detection process such as a ranging operation with the wearable device 120 in parallel). It should be understood that the term "in parallel" (or concurrently, simultaneously, etc.) in this context means that the ranging operation and the face detection operation are performed such that the respective operations at least partially overlap in time. However, there is no requirement that one or more steps of each operation be performed in unison. It also does not require that each operation start at the exact same time or be completed at the exact same time.

At 415, the UE 110 performs a face detection operation to determine whether there is a face (e.g., the user's face) in the field of view of the camera of the UE 110. It should be understood that this detection of the face is not a detection that the user's face has been determined by the face detection operation, just that a face is present and may be analyzed for the purposes of the face detection operation. If the UE 110 determines that a face is present in the field of view of the camera, then at 420, the UE 110 determines if a face covering on the face is detected. If a face covering is not detected, then the UE 110, at 425, performs the unlock operation using the conventional face detection process. If, however, a face covering is detected, then the UE 110, at 430, determines if ranging with the wearable device 120 has been successfully completed. If ranging has been successfully completed, then the UE 110, at 435, is unlocked based on successfully ranging with the wearable device. If, however, ranging has not been successfully completed, then, at 440, the UE 110 is not unlocked.

If, at 415, a face is not detected within the field of view of the UE's camera, then the UE 110 performs a silent cancellation at 445. To prevent the occurrence of consecutive (e.g., successive) silent cancellations, the UE 110, at 450, disables prewarming for a predetermined period of time or until one or more predetermined criteria are met. For example, in some embodiments, the UE 110 may disable prewarming after a silent cancellation is performed at 445 and may reactivate prewarming after the next successful unlocking of the UE 110 (e.g., via conventional face detection, entering of a password/passcode, etc.). In some embodiments, the UE 110 may disable prewarming for a predetermined period of time after a predetermined number of silent cancellations have occurred during a predetermined time interval. For example, the UE 110 may disable prewarming for a predetermined period of time after 70 silent cancellations in a day or 5 silent cancellations in 15 minutes. Both the threshold number of silent cancellations to disable prewarming and the period for which prewarming is disabled can be modified (e.g., to achieve a desired level of battery preservation) and can be dynamically adjusted based on an available level of battery charge.

In some embodiments, the UE 110 may disable prewarming for a predetermined period of time after a silent cancellation. In such an embodiment, the UE 110 may increase the period of time during which prewarming is disabled if a subsequent silent cancellation occurs before a successful unlocking of the UE 110 occurs. For example, if a silent cancellation occurs, the UE 110 may disable prewarming for a period (e.g., five minutes). After the expiration of the period, the UE 110 may reactivate prewarming. However, if a subsequent silent cancellation occurs before expiration of the period, then the UE 110 may increase the time period (e.g., to ten minutes). Any values may be used for the period and the extension of the period. The UE 110 may continue to increase the time period for every subsequent silent cancellation that occurs before expiration of the predetermined time period. The increase to the time period may be, for example, linear, exponential, predefined steps, etc. This disabling of prewarming is illustrated in FIG. 5, described below.

Although the method 400 disables prewarming if a user's face is not detected (e.g., at 415), it should be noted that prewarming may alternatively be disabled for a predetermined period of time or until a predetermined criteria has been met if any predetermined triggering event has not occurred.

Figure 5:
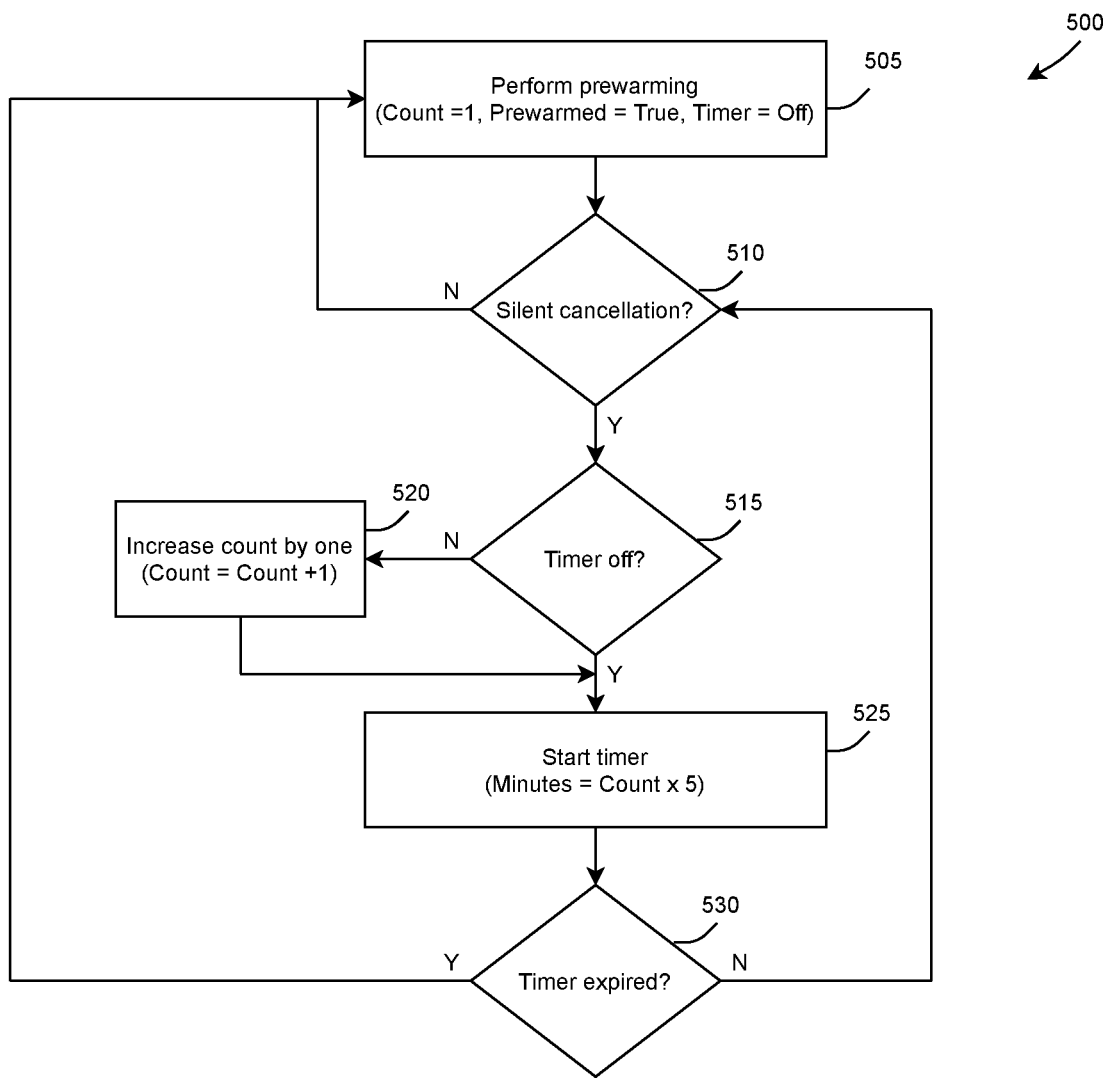
FIG. 5 shows an exemplary method of exponentially disabling prewarming according to various exemplary embodiments.

FIG. 5 shows an exemplary method 500 of disabling prewarming according to various exemplary embodiments. At 505, the UE 110 performs a prewarming operation. That is, the UE 110 performs a face detection process and a ranging process with the wearable device 120 in parallel. For parallel execution, the face detection process at least partially overlaps in time with the ranging process, as opposed to one process completing before the other is initiated. As noted in FIG. 5, the count (number of unlock attempts) at this point is 1, prewarming is enabled (prewarming=true), and a timer during which prewarming is disabled is off. At 510, the UE 110 determines whether a silent cancellation (e.g., the user did not intend to unlock the UE 110) occurs. If a silent cancellation does not occur (the user intended to unlock the UE 110 and the UE 110 successfully unlocks), then the method 500 returns to 505.

If, however, a silent cancellation does occur, then, at 515, the UE 110 determines whether the timer is off. If the timer is off, then at 525, the UE 110 starts the timer for the predetermined time period during which prewarming is disabled. If the timer is not off, then the timer has already been started previously. As such, at 520, the UE 110 increases the count by one. The method 500 then proceeds to 525. As illustrated in FIG. 5, the timer is defined by the product of the count and a predetermined time factor (e.g., 5 minutes). At 530, the UE 110 determines whether the timer has expired. If the timer has expired, then prewarming is reenabled and may be performed at 505 when the UE 110 wakes. If, however, the timer has not expired, then the method 500 returns to 510 where the UE 110 determines whether a subsequent silent cancellation (unsuccessful unlock attempt) has occurred. In some implementations, the predetermined time period during which prewarming is disabled can be increased, for example, in response to one or more silent cancellations while the timer is on.

Figure 6:
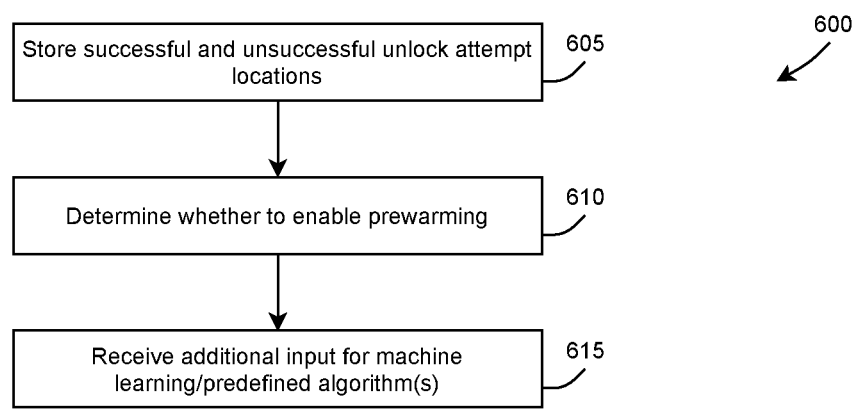
FIG. 6 shows an exemplary method of determining whether to enable prewarming according to various exemplary embodiments.

FIG. 6 shows an exemplary method 600 of determining whether to enable prewarming according to various exemplary embodiments. In some embodiments, the UE 110 may determine whether to enable prewarming based on the user's location. For example, as shown in FIG. 6, at 605, the UE 110 may store the location associated with successful and unsuccessful unlock attempts performed using prewarming. In some implementations, the stored locations may be bounded by one or more factors, such as time period (e.g., days, weeks, months, etc.), geography, etc. At 610, using machine learning, the UE 110 may determine whether to enable prewarming for future unlock attempts based on a current location of the UE 110 and the previously stored locations of the successful and unsuccessful unlock attempts. For example, the UE 110 may disable prewarming in a user's home since it is unlikely that the user is wearing a face covering (e.g., a mask) at home. In another example, the UE 110 may enable prewarming in a user's workplace or in a public place, since it is more likely that the user is wearing a face covering in such a location. Other examples of states the UE 110 may track for prewarming purposes are motion (e.g., driving, running, etc.) and/or activity (e.g., cycling, swimming, yoga, etc.).

In some embodiments, when both successful and unsuccessful unlock attempts have occurred at the same location, the UE 110 utilizes machine learning or predefined algorithm(s) based on multiple successful and unsuccessful attempts at that location to determine whether to enable prewarming. As such, in some embodiments, the UE 110 may receive additional input for machine learning or the predefined algorithm(s) at 615. In some embodiments, additional input(s) may include, for example, a type of wake (e.g., touch interaction, physical input such as the push of a button, opening of a UE protective case, coupling the UE to a power source, etc.), a state of the UE 110 (e.g., do not disturb, airplane mode, etc.), whether the UE 110 is connected to any or a specific Wi-Fi network or to a cellular network, whether the UE is in CARPLAY® mode, a speed of the UE 110, etc. may be additionally input to the machine learning to help the UE 110 make a more accurate determination of whether or not to enable prewarming at the UE's current location.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of an electronic device configured to perform operations comprising:
   performing a prewarming process for unlocking the electronic device, wherein the prewarming process includes concurrently performing a first unlock process configured to unlock the UE and a second unlock process configured to unlock the electronic device, wherein the first unlock process comprises a face presence operation to determine whether a face is within a field of view of a camera of the electronic device;
   when the face presence operation is satisfied, performing a face cover detection operation of the first unlock process comprising identifying whether a face covering is within the field of view of the camera;
   when the face cover detection operation is satisfied, unlocking the electronic device using the second unlock process of the prewarming process;
   when the face cover detection operation is not satisfied, unlocking the electronic device using a face detection operation of the first unlock process of the prewarming process; and
   when the face presence operation is not satisfied, disabling subsequent use of the prewarming process for a predetermined time period, wherein,
   when the prewarming process is disabled, the first unlock process and the second unlock process are performed in series.

2. The processor of claim 1, wherein the predetermined time period begins when the face detection operation is not satisfied and ends when the electronic device is subsequently successfully unlocked.

3. The processor of claim 1, wherein the prewarming process is disabled for the predetermined time period after a threshold number of unsuccessful unlock attempts using the prewarming process have occurred during a threshold time interval.

4. The processor of claim 1, wherein the predetermined time period is defined by a timer having a value equal to the product of (i) a number of unsuccessful unlock attempts using the prewarming process, and (ii) a time factor.

5. The processor of claim 4, wherein the predetermined time period is increased upon a subsequent unsuccessful unlock attempt before expiration of the timer.

6. The processor of claim 1, wherein the operations further comprise:
determining, when the face detection operation is not satisfied, whether a triggering event has occurred.

7. The processor of claim 1, wherein the second unlock process comprises a ranging process performed with a wearable device.

8. The UE of claim 1, wherein the second unlock process of the prewarming process does not use the camera of the electronic device.

9. The UE of claim 1, further comprising:
reactivating the prewarming process based on successfully unlocking the electronic device after disabling the subsequent use of the prewarming process.

10. An electronic device, comprising:
a transceiver configured to communicate with a wearable device; and
a processor communicatively coupled to the transceiver and configured to perform operations comprising:
performing a prewarming process for unlocking the electronic device, wherein the prewarming process includes concurrently performing a first unlock process configured to unlock the UE and a second unlock process configured to unlock the electronic device, wherein the first unlock process comprises a face presence operation to determine whether a face is within a field of view of a camera of the electronic device;
when the face presence operation is satisfied, performing a face cover detection operation of the first unlock process comprising identifying whether a face covering is within the field of view of the camera;
when the face cover detection operation is satisfied, unlocking the electronic device using the second unlock process of the prewarming process;
when the face cover detection operation is not satisfied, unlocking the electronic device using a face detection operation of the first unlock process of the prewarming process; and
when the face presence operation is not satisfied, disabling subsequent use of the prewarming process for a predetermined time period, wherein,
when the face prewarming process is disabled, the first unlock process and the second unlock process are performed in series.

11. The electronic device of claim 10, wherein the predetermined time period begins when the face detection operation is not satisfied and ends when the electronic device is subsequently successfully unlocked.

12. The electronic device of claim 10, wherein the prewarming process is disabled for the predetermined time period after a threshold number of unsuccessful unlock attempts using the prewarming process have occurred during a threshold time interval.

13. The electronic device of claim 10, wherein the predetermined time period is defined by a timer having a value equal to the product of (i) a number of unsuccessful unlock attempts using the prewarming process, and (ii) a time factor.

14. The electronic device of claim 13, wherein the predetermined time period is increased upon a subsequent unsuccessful unlock attempt before expiration of the timer.

15. The electronic device of claim 10, wherein the operations further comprise:
determining, when the face detection operation is not satisfied, whether a triggering event has occurred.

16. The UE of claim 10, wherein the second unlock process of the prewarming process does not use the camera of the electronic device.

17. A processor of an electronic device configured to perform operations comprising:
storing first locations corresponding to successful attempts to unlock the electronic device using a prewarming process, wherein the prewarming process includes simultaneously performing a first unlock process configured to unlock the electronic device comprising a face cover detection operation configured to identify the presence of a face covering within the field of view of a camera of the electronic device and a second unlock process configured to unlock the electronic device comprising a ranging process with a wearable device;
storing second locations corresponding to unsuccessful attempts to unlock the electronic device using the prewarming process;
determining whether to perform the prewarming process based on a current location of the UE and the first and second stored locations; and
when it is determined to use the prewarming process, the first unlock process and the second unlock process are performed simultaneously; and
when it is determined to not use the prewarming process, the first unlock process and the second unlock process are performed in series.

18. The processor of claim 17, wherein at least one of the first locations and at least one of the second locations comprises a same location, wherein the operations further comprise:
performing machine learning for multiple successful and unsuccessful attempts for the location to determine whether the location is to be considered one of the first locations or one of the second locations.

19. The processor of claim 18, wherein an input to the machine learning further comprises additional information about the location.

20. The processor of claim 19, wherein the additional information comprises a motion state of the UE.

* * * * *